W. C. BISELL.
STREET INDICATING DEVICE FOR TROLLEY SYSTEMS.
APPLICATION FILED FEB. 19, 1910.
1,009,637.
Patented Nov. 21, 1911.
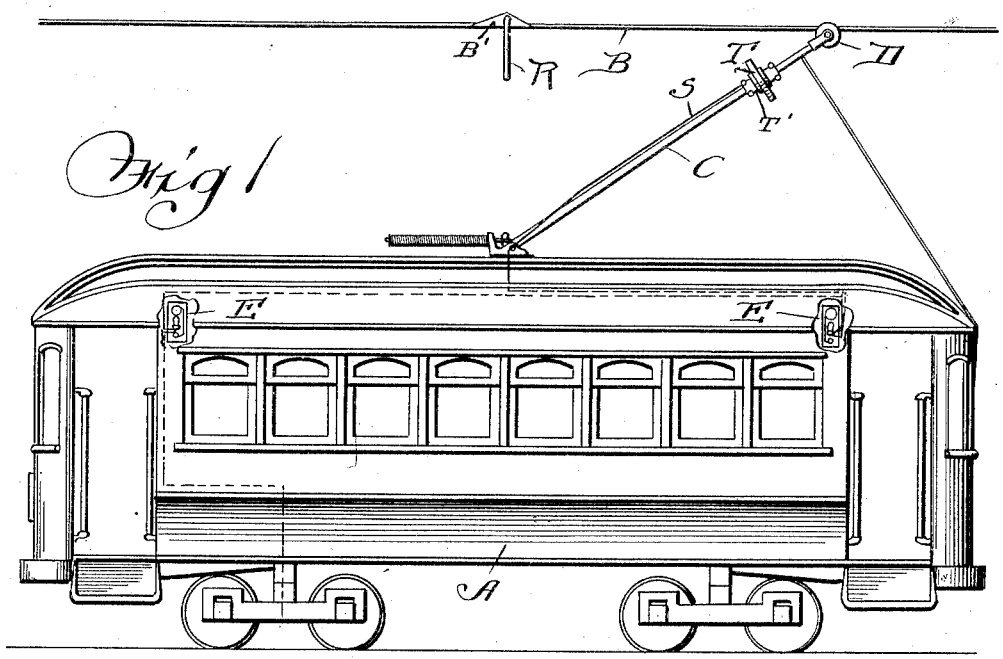
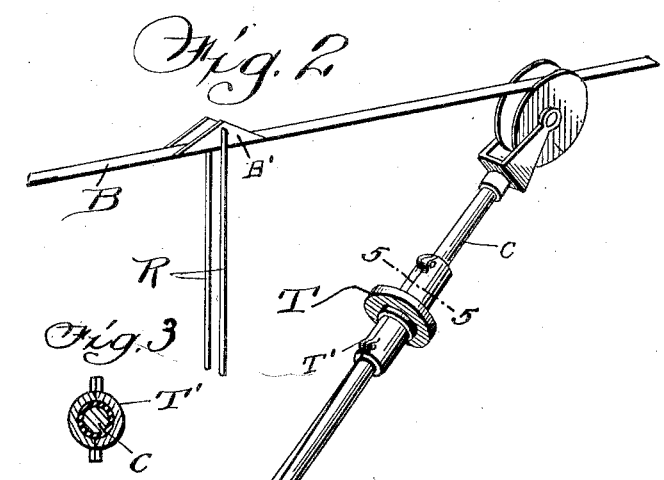

UNITED STATES PATENT OFFICE.

WILLIAM C. BISELL, OF WARDNER, IDAHO.

STREET-INDICATING DEVICE FOR TROLLEY SYSTEMS.

1,009,637.   Specification of Letters Patent.   Patented Nov. 21, 1911.

Application filed February 19, 1910. Serial No. 544,910.

*To all whom it may concern:*

Be it known that I, WILLIAM C. BISELL, a citizen of the United States, residing at Wardner, in the county of Shoshone and State of Idaho, have invented certain new and useful Improvements in Street-Indicating Devices for Trolley Systems; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in circuit closing apparatus for trolley mechanism, affording means whereby a circuit may be closed at intervals for actuating mechanisms of different kinds.

The invention comprises various details of construction, combinations and arrangements of parts which will be hereinafter fully described and then specifically defined in the appended claim.

I illustrate my invention in the accompanying drawings, in which:—

Figure 1 is a side elevation of a trolley car showing the trolley line and arm with contact points adapted to coöperate with electrical connections upon the trolley arm to close the circuit. Fig. 2 is a detail perspective view of a portion of a trolley arm and line wire and contact points for closing a circuit. Fig. 3 is a sectional view on line 3—3 of Fig. 2.

Reference now being had to the details of the drawings by letter, A designates a trolley car, B the trolley line and C the trolley arm of the usual construction, having a trolley wheel D moving in contact with the line wire.

While it will be understood that the present invention relates particularly to circuit closing devices, I have shown in Fig. 1 an outline of an indicator box E which is adapted to be connected to the circuit wires S of the trolley whereby, when the trolley wheel comes in contact with the fingers R, certain indicating mechanism not shown may be actuated.

Fixed to the trolley wire are the fangs or contact fingers R pivotally mounted upon projections B' of the trolley line and are disposed in the path of the wheel T which is rotatably mounted upon the split shell or collar T' of the trolley pole and insulated therefrom, said wheel T forming a terminal adapted to contact with the depending fingers R. Circuit wires S electrically connect with the collar which in turn is electrically connected with the wheel T and affords means whereby an electric circuit is formed through the indicating device. By the provision of the wheel T, it will be noted that, in the event of the trolley wheel D jumping the trolley line, said wheel T will not interfere with the trolley line in the event of its coming in contact therewith.

What I claim to be new is:—

A circuit closing device for trolley apparatus comprising a line wire, members fastened to the line wire, depending fingers pivotally connected to said members, a trolley pole, a wheel mounted thereon and adapted to contact with said line wire, a split collar fastened to said pole, and a wheel journaled upon said collar co-axially therewith and adapted to contact with said depending fingers to close the electrical circuit.

In testimony whereof I hereunto affix my signature in presence of two witnesses.

WILLIAM C. BISELL.

Witnesses:
LEWIS WOLFLEY,
ELIZABETH WOLFLEY.

---

Copies of this patent may be obtained for five cents each, by addressing the "Commissioner of Patents, Washington, D. C."